United States Patent Office 3,417,919
Patented Dec. 24, 1968

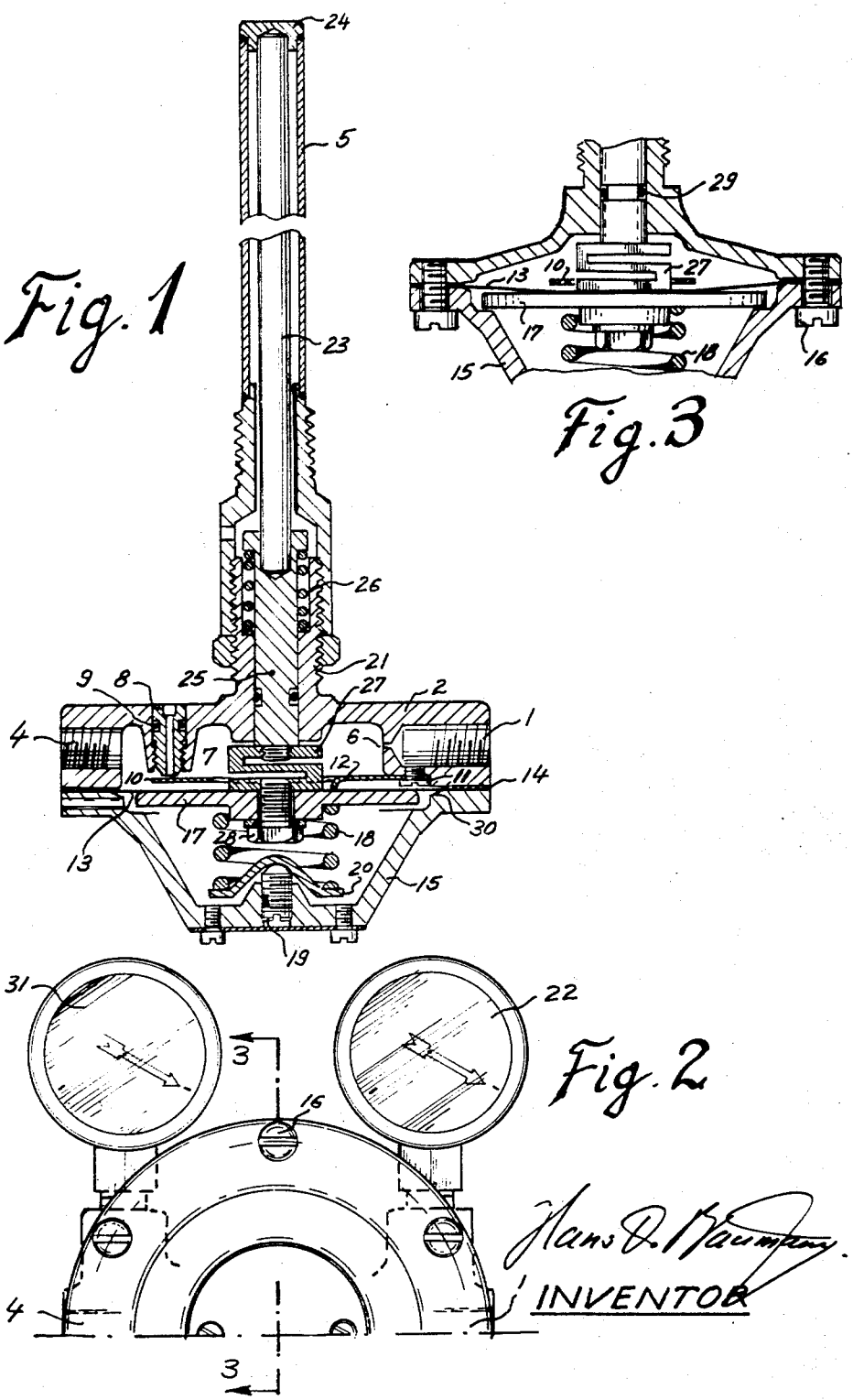

3,417,919
PNEUMATIC TEMPERATURE TRANSMITTERS
Hans D. Baumann, Decatur, Ill.
(Route des Isles 14, Conde-sur-Noireau, France)
Filed Mar. 28, 1966, Ser. No. 537,848
1 Claim. (Cl. 236—87)

ABSTRACT OF THE DISCLOSURE

Apparatus for transforming the expansion of a bi-metallic bulb, caused by changes in fluid temperature to be measured, into a proportional pneumatic signal capable of being transmitted to a remote indicating gage. In the apparatus the proportion between the sensed temperature and the span of air signal pressure can be adjusted through a variation in the effective area of a stiff, flexible metal diaphragm.

---

The invention here described relates to a device capable of measuring fluid temperature and transmitting a proportional pneumatic signal thereof to a remote receiver. A primary application for this device is found in automatic process control systems where the transmitter senses the temperature variable and transmits a corresponding signal to a remote controller which commands a control valve to rectify the temperature by varying the flow of heating or cooling media through the system, if an error should exist. The present invention has for an important object to provide an efficient means of measuring and transmitting said fluid temperature, which is small and compact and which components exclude amplifying valves, bearings and other delicate parts normally found in instruments of this type and which are subject to vibration damage.

Other objections are to provide a temperature transmitter which employs a minimum number of parts for economy of production and simplicity of adjustment. Temperature transmitters of present design employ a force-balanced beam arrangement which performance depends on the force input of a liquid or gas filled temperature sensing element and its capillary. My device, on the other hand, utilizes a bi-metallic bulb which thermal expansion is converted by means of a special spring arrangement into a representative input force. Yet, still another object of my invention is the elimination of the characteristic time lag in temperature sensing typical with conventional devices operating with expanding liquids or gases.

Instead of manipulating with levers and fulcrum points to vary the span or ratio between temperature and signal variation, my invention offers means to change the effective area of the feed-back diphragm in a stepless fashion to achieve the same results; as is more clearly shown in the following description in conjunction with the annexed drawings, wherein:

FIG. 1 is a vertical, central, cross-sectional view taken along the horizontal centerline of FIG. 2 and showing the structure and arrangements of parts of my invention.

FIG. 2 shows the partial front view of my invention.

FIG. 3 is a vertical, central, cross-sectional view, taken along the vertical centerline 3—3, more closely identified in FIG. 2, showing the central portion of my invention with the diaphragm in the "short span" position and compression spring 27 shown 90° off the true position for enhanced clarification.

Referring now to the drawings in greater detail, pneumatic supply pressure indicated on a suitable pressure gage 22 enters port 1 located in housing 2 of the transmitter, shown in FIG. 1. A second port 4 is used to pipe the generated signal to a remote reading device (not shown). The signal, which is proportional to the temperature sensed by a bulb 5, is produced by varying the exhaust rate of air entering from port 1 and through a throttling orifice 6. The exhaust rate from cavity 7 is a function of a gap between an adjustable nozzle 8, sealed by an O-ring 9, and a movable flapper 10. Flapper 10 is fastened to housing 2 by a screw 11 and has a protruding portion 12, which is in contact with a flat metallic feed-back diaphragm 13. The protruding portion 12 is so located that a small motion of the diaphragm 13 produces in an even larger change in the gap between nozzle 8 and flapper 10. This amplification is caused by a cantilever effect produced by the advantage in length between screw 11 and adjustable nozzle 8 on one hand, and the distance between protruding portion 12 and screw 11 on the other hand.

Diaphragm 13 is clamped between housing 2, a suitable gasket 14, and a lower flange 15 by means of a number of bolts 16. The central portion of said diaphragm is supported by a plate 17 which, in turn, engages a coiled compression spring 18. The load of the latter may be adjusted by means of an adjusting screw 19 and a button 20.

Housing 2 is adjustably engaged by means of a threaded portion 21 with a bulb 5 fabricated from a material having a known coefficient of thermal expansion. Said bulb contains within a rod 23 preferably made of a 36% Ni-64% Fe alloy having very little or no thermal expansion. The upper terminating portion of rod 23 engages the closing cap 24 of bulb 5, while its opposite end is guided and in contact with a stem 25. A coiled compression spring 26 maintains a close contact at all times with rod 23. Said stem is connected by means of a threaded portion to a specially fabricated compression spring 27, here shown in the form of an S, whose lower flange is secured to diaphragm 13 and plate 17 by a bolt 28. An O-ring seal 29 is provided to prevent escape of air from cavity 7.

Since the motion experienced by bulb 5 as function of its thermal expansion is very minute, a very high spring rate is required to convert this motion into a measurable force input. Such spring rate is impossible to obtain with a conventional coiled spring without considerable sacrifice in hysteresis. The special compression spring 27, on the other hand, allows such performance due to its special configuration. It may be noted that all deflection and load is produced in bending, none in torsion.

Having thus described the individual components, I will now describe the operation of this temperature transmitter. First, it should be understood that this instrument operates on the principle of force-balance. This means, input force created by compression of spring 27 through motion of stem 25, plus signal pressure times the effective area of the diaphragm 13 equal the opposite force of spring 18 at all times.

$$fK + PA = L$$

where $f$ is the motion of stem 25, $K$ the spring rate of spring 27, $P$ the signal pressure, $A$ the effective area of diaphragm 13, and $L$ the load of spring 18. It is apparent now, that, by varying $L$ and keeping all other variables constant, $P$ the signal pressure has to change. Hence, by adjusting set screw 19 the initial signal under any given temperature may be adjusted for calibrating purposes.

Whenever bulb 5, inserted in the fluid to be measured, experiences a temperature increase, it will expand. Rod 23 will follow this motion and so will stem 25 producing a negative motion $f$. This will reduce the input force of spring 27 and, as a result, diaphragm 13 will move up temporarily, causing flapper 10 to reduce the gap in respect to nozzle 8. Such a reduction in gap will decrease the exhaust area and thereby lead to an increase in signal pressure $P$ in cavity 7 which, again, will balance the above equation. It can be seen, therefore, that an increase in temperature sensed will also lead to a proportional increase in signal pressure, shown on an output gage 31, which can be piped to a remote read out gage calibrated, for instance, in ° F. instead of p.s.i. Any reduction in temperature will decrease the signal accordingly.

Manufacturing tolerances will allow spring rate K to vary. It is therefore necessary to provide means to calibrate the span or range between two temperature extremes in regard to a specific air signal variation, such as 3–15 p.s.i.g. My invention provides for such a calibration in a novel manner. Again referring to the above equation, the pressure variation for a certain tempearture change ($fK$) can be changed by a modification in the effective area A of diaphragm 13. May it be stated now, that the effective area of a diaphragm is the area of a circle passing through the midpoint of a line drawn between the inner and outer points of support of said diaphragm. These points of support can be decreased in diameter (and thereby the effective area) by downward deflection of the diaphragm, as shown in FIG. 3. A right hand turn in nozzle 8 will temporarily close the exhaust gap. This will lead to an increase in signal pressure which forces the diaphagm 13 down together with flapper 10, since there is no other change in either the input force ($fK$) or the spring load L. As a result, the diaphragm (made of relatively stiff metal, such as Phosphor Bronze) will bend along the tapered inner periphery 30 of lower flange 15 (shown exaggerated), thereby reducing its outer contact diameter. At the same time the diaphragm lifts off plate 17 which reduces the inner contact diameter. The resultant reduction in area A will result in a larger change of signal span P for the same input force $fK$, or to express it differently, less temperature change is required to produce a given signal span. Therefore, a right-hand turn of nozzle 8 will shorten the temperature span, a left hand turn, on the other hand, will increase the temperature span for any given signal range. One may use a given temperature transmitter for a 100° F. temperature span or, by reducing area A by 50%, for a 50° F. span without need for additional parts.

Ambient temperature variations may affect the modulus of elasticity of the various spring components within this transmitter and could therefore lead to an error in temperature readings of the fluid in contact with bulb 5. A compensating effect for such ambient temperature change is provided by specifying a material of construction for stem 25 that has a substantially different coefficient of thermal expansion than the surrounding material of housing 2. Such differences in expansion will counteract the ambient temperature effects on the instrument housing or its internal parts by adding or subtracting a certain amount to or from the bulb motion $f$.

Even though the invention has been disclosed in connection with a specific embodiment of the same, it will be understood that this is intended by way of illustration only and that numerous changes can be made in the construction and arrangement of parts without departing from the spirit of the invention or the scope of the appended claims. For instance, a conventional coiled compression spring could replace spring 27, although the use of the spring configuration shown is preferred for reasons outlined before. May it also be understood that a conventional amplifying relay could be added to the signal line, in order to boost the signal pressure or to increase the air volume piped to the receiver.

Having thus clearly shown and described the invention, what is claimed as new and desired to secure by Letters Patent is:

1. In combination a bi-metallic sensing device and a pneumatic supply of fluid comprising a bi-metallic sensing device connected to a housing, spring means threadably connected between the movable portion of said bi-metallic sensor and a flat metallic diaphragm supported by a plate, additional spring means engaging said plate supporting said diaphragm within a housing, said housing having an inlet and outlet port for said pneumatic fluid with a throttling orifice in said housing at one end of the inlet through which air enters a center cavity in said housing, signal pressure means comprising an adjustable air metering device including a flapper and nozzle arrangement located in said cavity, said flapper having one end mounted in the housing with a protruding portion thereof supportably contacting said diaphragm in cantilever fashion and the other end cooperating with the nozzle to form a variable restriction for said pneumatic fluid system whereby changes in the temperature sensed will vary the gap between said baffle and nozzle to produce a corresponding change in signal pressure.

References Cited

UNITED STATES PATENTS

| | | | |
|---|---|---|---|
| 1,679,165 | 7/1928 | Morrow | 73—362.3 X |
| 2,008,765 | 7/1935 | McCullough | 267—1 |
| 2,972,443 | 2/1961 | Watrous | 137—85 X |
| 3,064,476 | 11/1962 | Naples | 73—363 |
| 889,182 | 5/1908 | Davis | 236—87 |
| 1,019,496 | 3/1912 | Larson | 236—87 |
| 3,283,581 | 11/1966 | DuBois et al. | 236—87 X |

FOREIGN PATENTS

| | | |
|---|---|---|
| 580,140 | 7/1959 | Canada. |
| 780,544 | 8/1957 | Great Britain. |

LOUIS R. PRINCE, *Primary Examiner.*

D. M. YASICH, *Assistant Examiner.*

U.S. Cl. X.R.

236—102; 73—362.3